United States Patent
Stuart et al.

(10) Patent No.: US 10,378,740 B2
(45) Date of Patent: Aug. 13, 2019

(54) BATTERY-POWERED LIGHT FOR A DECK RAILING

(71) Applicant: Lacks Home Products, Kentwood, MI (US)

(72) Inventors: Scott Stuart, Grand Rapids, MI (US); Michael Modrusic, Novi, MI (US)

(73) Assignee: Lacks Home Products, Kentwood, MI (US)

( * ) Notice: Subject to any disclaimer, the term of this patent is extended or adjusted under 35 U.S.C. 154(b) by 0 days.

(21) Appl. No.: 15/486,759

(22) Filed: Apr. 13, 2017

(65) Prior Publication Data

US 2017/0241626 A1  Aug. 24, 2017

Related U.S. Application Data

(63) Continuation-in-part of application No. 15/049,793, filed on Feb. 22, 2016.

(51) Int. Cl.
| | |
|---|---|
| *F21V 21/088* | (2006.01) |
| *F21V 23/04* | (2006.01) |
| *F21S 9/03* | (2006.01) |
| *F21V 1/00* | (2006.01) |
| *F21W 131/10* | (2006.01) |
| *F21V 21/34* | (2006.01) |
| *F21Y 115/10* | (2016.01) |

(52) U.S. Cl.
CPC ............ *F21V 21/088* (2013.01); *F21S 9/037* (2013.01); *F21V 23/0442* (2013.01); *F21V 23/0464* (2013.01); *F21V 1/00* (2013.01); *F21V 21/34* (2013.01); *F21W 2131/10* (2013.01); *F21Y 2115/10* (2016.08); *Y02B 20/72* (2013.01)

(58) Field of Classification Search
CPC ........ F21W 2111/023; F21W 2131/103; F21L 4/027; F21V 21/088; E04G 5/14
See application file for complete search history.

(56) References Cited

U.S. PATENT DOCUMENTS

| | | | | |
|---|---|---|---|---|
| 1,303,555 | A * | 5/1919 | Haussmann et al. | ................ F21V 21/088 24/332 |
| 5,707,136 | A * | 1/1998 | Byers | ............. F21V 21/088 362/145 |
| 6,776,504 | B2 * | 8/2004 | Sloan | ............. F21V 21/005 362/147 |
| 6,951,408 | B2 * | 10/2005 | Stewart | ............. F21V 21/088 362/183 |
| 7,059,749 | B1 * | 6/2006 | Bernier | ............. F21V 21/088 24/336 |
| 7,419,276 | B2 * | 9/2008 | Sheridan | ............. F21S 4/20 362/151 |
| 7,686,485 | B1 * | 3/2010 | Pever | ............. F21V 27/00 362/152 |
| 8,733,710 | B1 * | 5/2014 | Suazo | ............. F21V 21/088 248/73 |

(Continued)

*Primary Examiner* — Ismael Negron
(74) *Attorney, Agent, or Firm* — John S. Artz; Dickinson Wright PLLC

(57) ABSTRACT

A light assembly includes a C-shaped body defined by a top plate extending between two legs, and LED light provided within the body, and a battery also provided within the body. Each of the legs of the core may define a clamping member projecting from a corresponding one of the legs towards the other one of the legs, and each clamping member having a V-shaped cross-section.

21 Claims, 10 Drawing Sheets

(56) References Cited

U.S. PATENT DOCUMENTS

| | | | | |
|---|---|---|---|---|
| 8,801,214 B2* | 8/2014 | Chrysanthous | ....... | F21V 21/088 362/191 |
| 8,806,736 B1* | 8/2014 | Novak | ................ | E04F 11/1861 256/23 |
| 2008/0080174 A1* | 4/2008 | Xu | ......................... | F21S 8/081 362/152 |
| 2016/0327233 A1* | 11/2016 | Wei | ......................... | F21S 9/037 |
| 2016/0376809 A1* | 12/2016 | McPeak | ................ | F21V 21/088 362/145 |

* cited by examiner

1

BATTERY-POWERED LIGHT FOR A DECK RAILING

CROSS REFERENCE TO RELATED APPLICATION

This U.S. continuation-in-part patent application claims the benefit of U.S. application Ser. No. 15/049,793, filed Feb. 22, 2016, the contents of which are incorporated herein by reference in its entirety.

TECHNICAL FIELD

The present disclosure relates generally to light assemblies for attachment to the railing of a deck, such as those found on residential and commercial patios. More specifically, the present disclosure relates to a deck light having a C-shaped body with opposing clamping members for releasably securing the deck light assembly to the deck railing.

BACKGROUND OF THE DISCLOSURE

Light assemblies have long been available for attachment or use with decks, such as those installed on household or commercial patios. Many of such light assemblies include LED lights with batteries and solar cells to charge the batteries during daylight hours. Stalk-type lights are the most common of such light assemblies and typically include a round lens on top of a post or pole, with a pointed stake at the bottom for holding the light upright in the ground. The round lenses on such stalk-type lights allow them to provide illumination in all directions. Variations on the stalk-type light are known for use with decks, such as those with a clip or clamp in place of or in addition to the pointed stake. Another known type of light assembly for use with decks is an L-Shaped light, which is typically screwed in place on a vertical edge such as a stair tread or railing side. These L-shaped lights typically include lenses with a horizontal profile and a semicircular cross-section to provide downward and outward illumination.

In view of the above, there remains a need for an improved deck light assembly that provides for a compact profile, and which can be easily installed and removed from a deck railing. Such a compact profile is both aesthetically appealing and functionally advantageous in that a compact deck light is less likely to be bumped or blown out of place. There also remains a need for a deck light that provides tasteful and useful directed lighting and which remains in place until a person chooses to relocate it, and which requires minimal effort to disengage from the deck railing.

SUMMARY OF THE DISCLOSURE

It is therefore an aspect of the present disclosure to provide a compact light assembly for attachment to a deck railing.

It is another aspect of the present disclosure to provide a light assembly for attachment to a deck railing that can be readily attached and detached.

In accordance with the above and other aspects, a deck light assembly for attachment to a deck railing is provided. The deck light assembly includes a C-shaped body including a top plate that extends between a first leg and an opposing second leg. The top plate defines an upper surface facing generally upward and a lower surface between the legs for engaging a top surface of the deck railing. A battery and an LED light may be disposed within the body of the deck light assembly. The deck light assembly may include a generally V-shaped clamping member extending from the first leg with a top portion extending from the first leg generally inwardly toward the second leg and generally downwardly away from the top plate to a knuckle, and with a bottom portion extending generally downwardly from the knuckle and generally outwardly toward the first leg. The clamping member is normally biased inwardly to apply a clamping force to the deck railing, with the top portion or the knuckle of clamping member engaging the side or the bottom of the deck railing. The bottom portion of the clamping member may remain spaced from the deck railing to allow a person to easily grab the bottom portion and to bend the clamping member outwardly to release the clamping force and remove or reposition the deck light assembly on the deck railing.

BRIEF DESCRIPTION OF THE DRAWINGS

Other aspects of the present disclosure will be readily appreciated, as the same becomes better understood by reference to the following detailed description when considered in connection with the accompanying drawings wherein.

DESCRIPTION OF THE PREFERRED EMBODIMENTS

Figure 1:
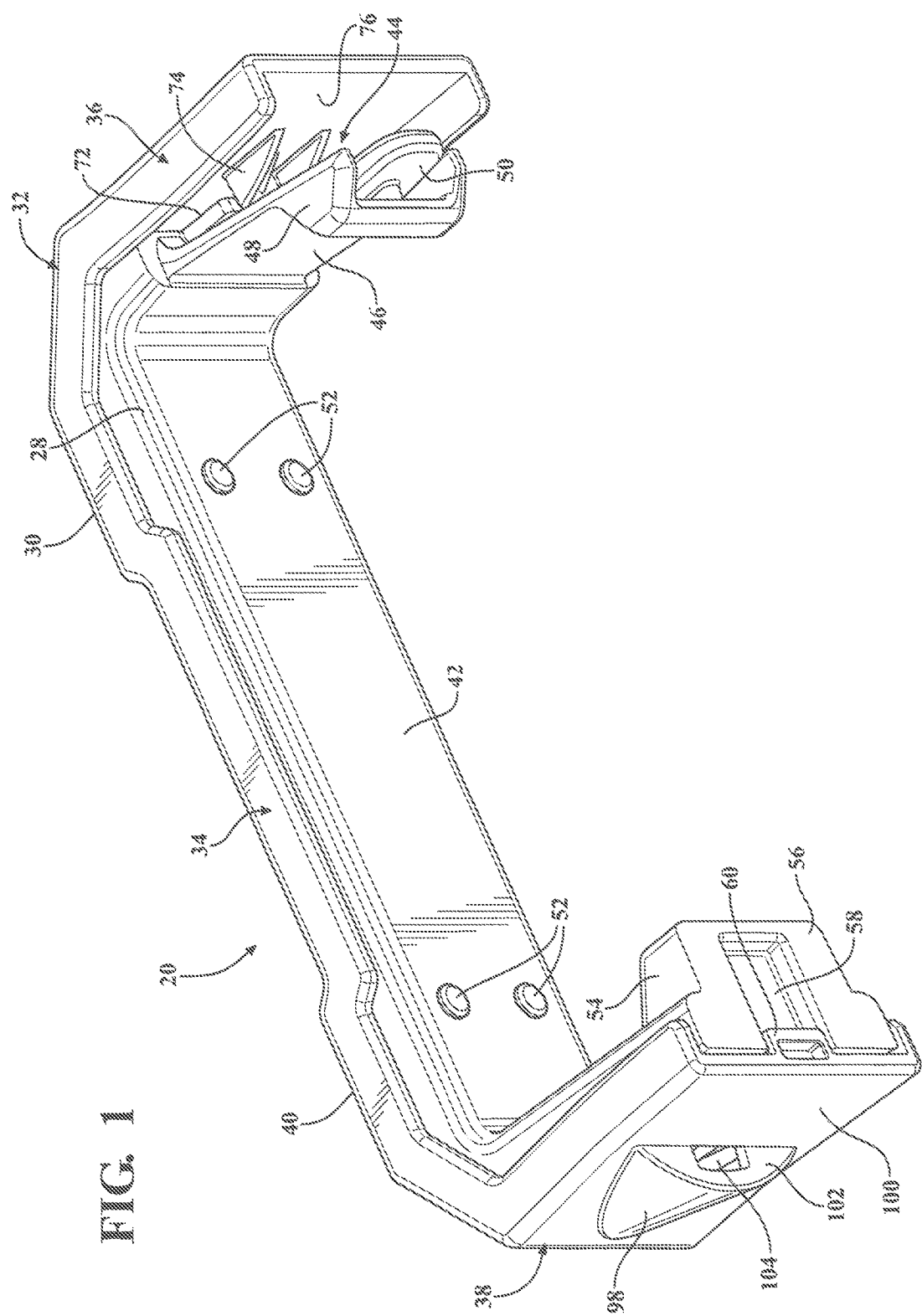
FIG. 1 is a perspective view of a deck light assembly in accordance with an aspect of the disclosure.

Referring to the Figures, wherein like numerals indicate corresponding parts throughout the several views, a deck light assembly 20, 120 is generally shown for attachment to a deck railing 22 having a top surface 24 and a bottom surface 26, and a pair of side surfaces 25 extending therebetween. According to an aspect, the disclosed deck light assembly 20, 120 can be easily attached and retained on a deck rail without the need to use wood screws or other permanent security mechanism. According to an aspect, the disclosed deck light assembly 20, 120 can be located for direct lighting placement to allow increased visibility at night, such as for illuminating a plant, a drink cooler, a water feature, etc. This can be accomplished by a simple push and release mechanism, such as disclosed herein.

According to an aspect, as exemplarily shown in FIGS. 1-5, the deck light assembly 20 may include a C-shaped core 28 nested within a C-shaped cover 30 together comprising a C-shaped body 32. The cover 30 and the body 32 may be fixedly secured to one another but may also be detachable. The C-shaped body 32 includes a top plate 34 extending between a first leg 36 and a second leg 38. The top plate 34 defines an upper surface 40 facing generally upward and a lower surface 42 between the legs 36, 38 for engaging the top surface 24 of the deck railing 22. It will be appreciated that the assembly 20, 120 could be utilized in connection with a variety of other suitable applications. According to an aspect, the assembly 20, 120 may be constructed of a durable and weatherable material, such as a plastic material.

Figure 5:
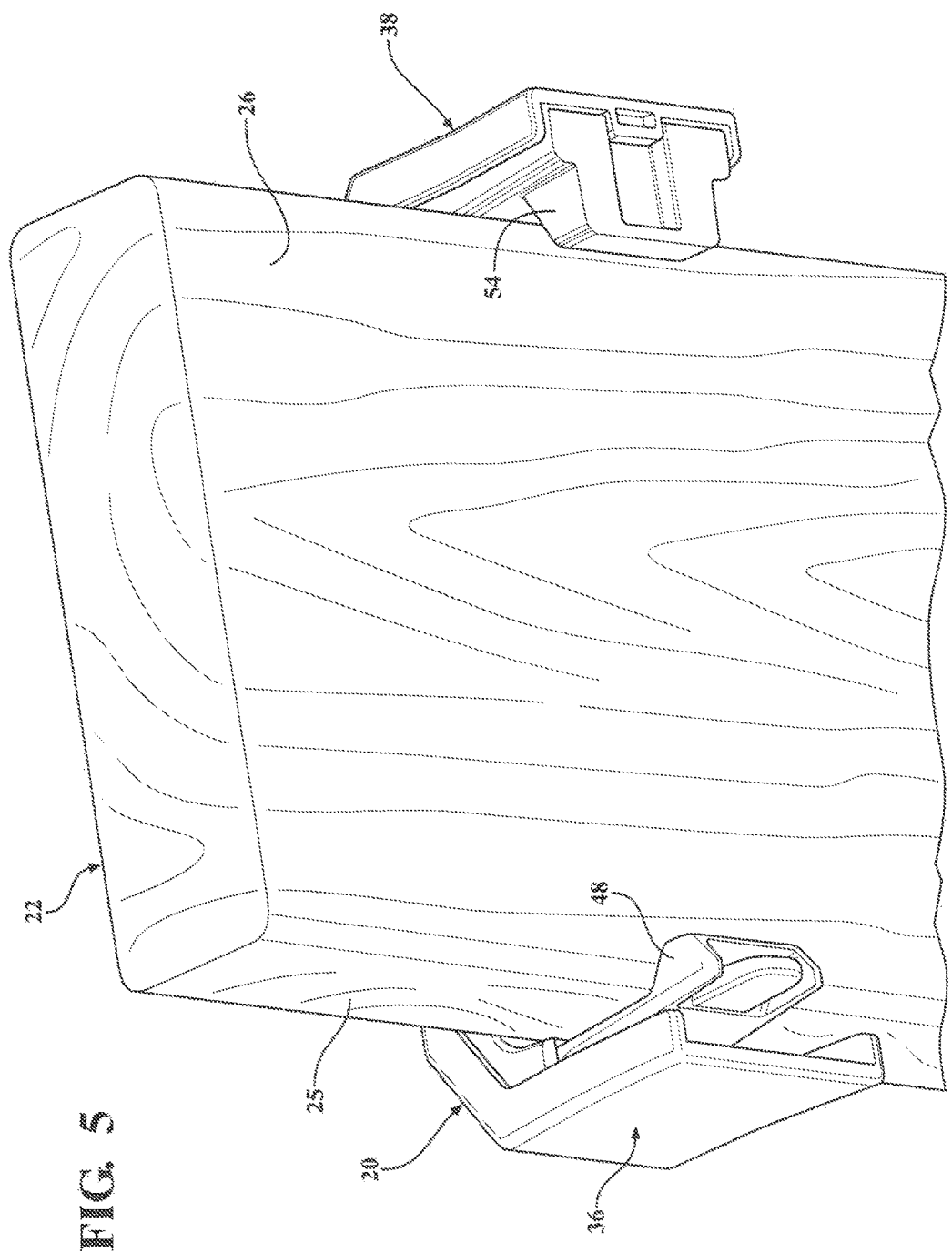
FIG. 5 is a perspective view of a deck light assembly engaging a deck railing in accordance with an aspect of the disclosure.

According to an aspect and as exemplarily shown in FIG. 1, a catch 44 is integrally formed with the core 28 and disposed on the first leg 36. The catch 44 can include a planar portion 46 extending away from the top plate 34 to a first foot 48. The catch 44 may be biased inwardly to engage the planar portion 46 and the first foot 48 with the deck railing 22, as shown in FIG. 5. The catch 44 may also be configured to flex outwardly for disengaging the deck light assembly 20 from the deck railing 22. With the catch 44 in its outward or disengaged position, the deck light assembly 20 may be slid along the deck railing 22 to another location or may be lifted and removed entirely. A nub 50 may extend generally downward from the catch 44 beyond the first foot 48 for application of an outward force to cause the planar portion 46 to flex outwardly and allow the deck light assembly 20 to be attached or removed from the deck railing 22. The nub 50 may have an arc-shape configured to be pushed or pulled with a thumb or finger. However, it may have a variety of other suitable configurations.

According to an aspect shown in FIG. 1, a plurality of standoffs 52 may be disposed on the lower surface 42 of the top plate 34 for spacing the deck light assembly 20 from the top surface 24 of the deck railing 22 and allowing airflow therebetween. This spacing may provide for cooling of the deck light assembly 20 and also prevent moisture from collecting therebetween.

According to an aspect, and as exemplarily shown in FIG. 5, the first foot 48 can extend inwardly from the first leg 36 of the core 28 opposite the top plate 34 for engaging the bottom surface 26 of the deck railing 22 to secure the deck light assembly 20 in place on the deck railing 22. The first foot 48 may have a generally triangular cross-section. A second foot 54 may extend inwardly from the second leg 38 of the core 28 opposite the top plate 34 for engaging the bottom surface 26 of the deck railing 22 to further secure the deck light assembly 20 in place on the deck railing 22. The second foot 54 may have a generally trapezoidal cross-section with a floor 56 that extends parallel to and spaced from the top plate 34. According to one aspect, the floor 56 can define an indentation 58 configured to receive a first tab 60 that extends inwardly from the second leg 38 of the cover 30 to secure the core 28 with the cover 30. The indentation 58 in the floor 56 of the second foot 54 and the first tab 60 may each, for example, have corresponding rectangular shapes. It should be appreciated that the feet 48, 54 may have other cross-sections including, as examples, L-shaped, triangle, trapezoid, semicircular, and combinations thereof.

Figure 2:
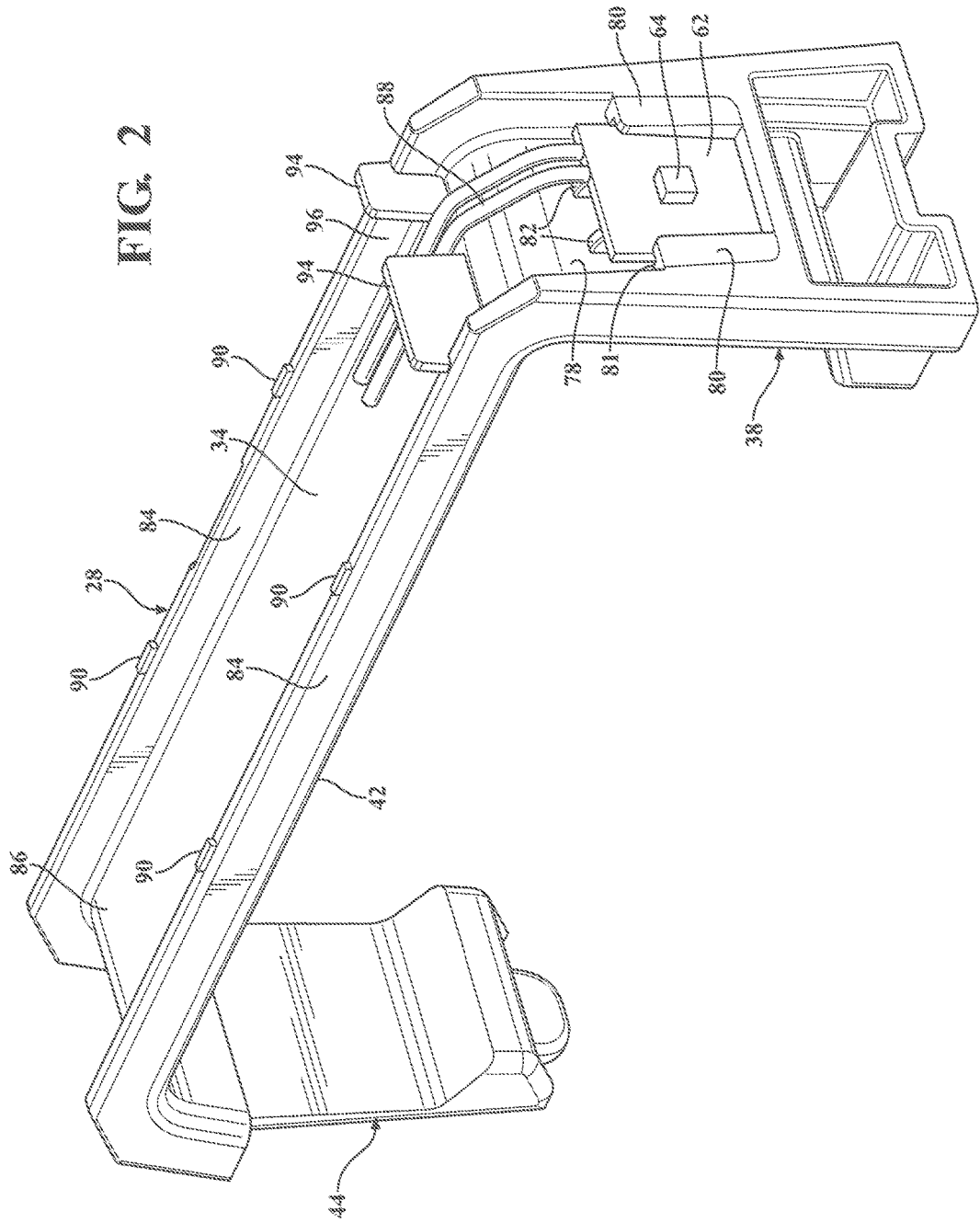
FIG. 2 is a perspective view of a core for a deck light assembly in accordance with an aspect of the disclosure.
Figure 3:
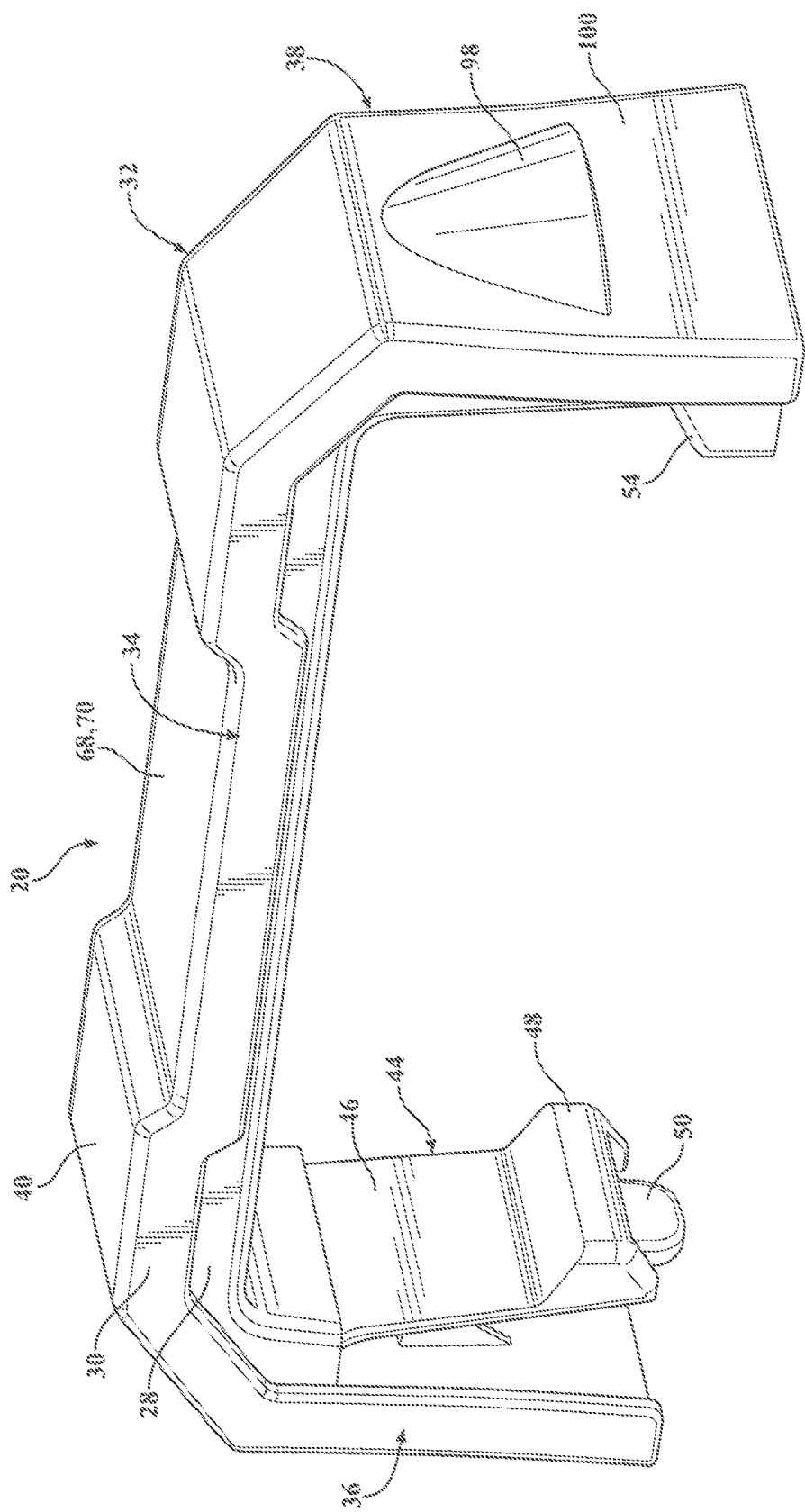
FIG. 3 is a perspective view of a deck light assembly in accordance with an aspect of the disclosure.
Figure 4:
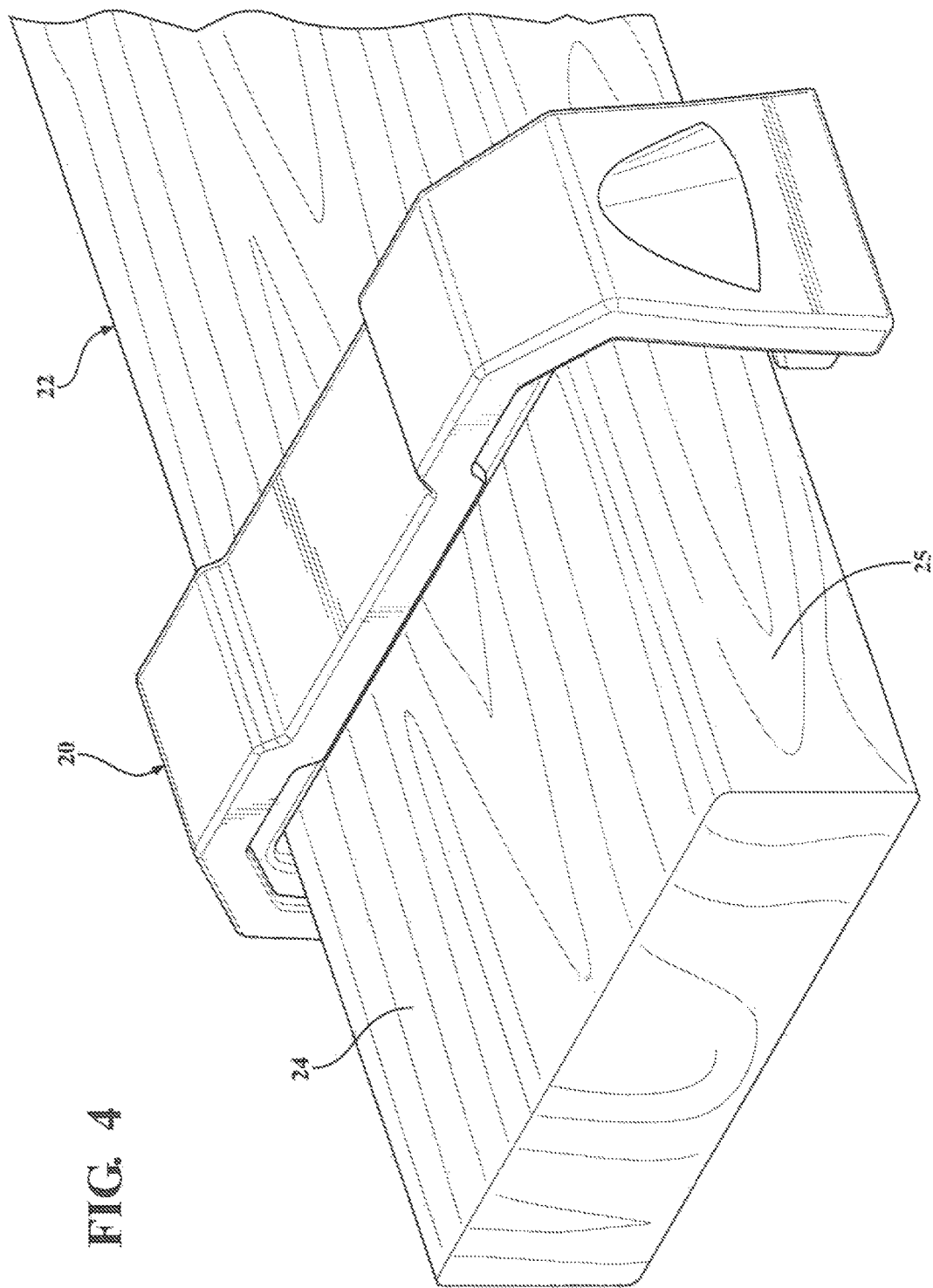
FIG. 4 is a perspective view of a deck light assembly engaging a deck railing in accordance with an aspect of the disclosure.

According to an aspect and as exemplarily shown in FIG. 2, a circuit board 62 with an LED light 64 may be disposed between the core 28 and the cover 30. A battery (not shown in the Figures) may also be disposed between the core 28 and the cover 30 within the deck light assembly 20. Those skilled in the art would appreciate that other energy storage devices, such as capacitors, could be used in place of a battery 66.

According to an aspect, the upper surface 40 of the top plate 34 can define an inset panel 68 located centrally between the legs 36, 38 which can hold a solar panel 70 for charging the battery when exposed to light and causing the circuit board 62 to illuminate the LED light 64 in response to an absence of ambient light. It should be appreciated that the solar panel 70 may also be mounted flush with or protruding above the upper surface 40 of the top plate 34.

According to an aspect and as exemplarily shown in FIG. 1, a second tab 72 may be integrally formed with the core 28 as a portion of the first leg 36 and can extend perpendicular to the top plate 34 adjacent the cover 30. A ledge 74 may be integrally formed with the cover 30 extending inwardly from an inner surface 76 of the first leg 36 for engaging the second tab 72 to secure the core 28 with the cover 30 at the first leg 36.

According to an aspect and as exemplarily shown in FIG. 2, the core 28 can define an interior surface 78 on the second leg 38 with a set of third tabs 80 defining a pocket 81 on the interior surface 78 for holding the circuit board 62 with the LED light 64 attached. A set of rails 82 may protrude from the interior surface 78 within the pocket for securing the circuit board 62 in wedging engagement with the third tabs 80.

According to an aspect and as exemplarily shown in FIG. 2, the core 28 may define a pair of walls 84 extending upwardly from the lower surface 42 parallel to one another along the sides of the top plate 34. A cavity 86 can extend between the walls 84 of the core 28 and below the cover 30 and may contain any combination of wires 88 and the solar panel 70 and the battery 66 and the circuit board 62. A plurality of fourth tabs 90 may extend further upward from the walls 84 for engaging corresponding depressions in the cover 30 to prevent relative motion between the core 28 and the cover 30. A partition 94 may extend between the walls 84 adjacent the second leg 38 and may define a notch 96 for accepting wires 88 between any of the solar panel 70 and the circuit board 62 and the battery 66 and the LED light 64.

The deck light assembly 20, 120 may include a shade 98 with the LED light 64 contained therein for directing the output of the LED light 64 in a predetermined pattern. According to an aspect and as exemplarily shown in FIG. 1, the shade 98 can be parabolic parabolic shape protruding from an outer surface 100 of the second leg 38 and can extend to a flat bottom 102 defining a hole 104 of generally rectangular shape for allowing light to shine downwardly from the deck railing 22.

According to another aspect, the deck light assembly 20 may be configured for attachment to a deck railing having one or more surfaces. The deck light assembly 20 may include a body 32 having an interior surface configured to mimic at least a portion of the deck railing 22. A portion of the body 32 may include a catch 44 having a planar portion 46. The catch 44 can also include a first foot 48 that extends inwardly from the planar portion 46 for engaging at least one of the surfaces of the deck railing 22. The catch 44 may be biased inwardly to engage the planar portion 46 with the deck railing 22. The catch 44 may also be configured to flex outwardly for disengaging the deck light assembly 20 from the deck railing 22. With the catch 44 in its outward or disengaged position, the deck light assembly 20 may be slid along the deck railing 22 or may be lifted and removed entirely.

According to an aspect exemplarily shown in FIGS. 6-12, the deck light assembly 120 may include a C-shaped core 128 nested within a C-shaped cover 130 together comprising a C-shaped body 132. The core 128 and the cover 130 may be fixedly secured to one another, such as with fasteners, which may be, for example, screws 133. The C-shaped body 132 includes a top plate 134 extending between a first leg 136 and a second leg 138. The top plate 134 defines an upper surface 140 facing generally upward and a lower surface 142 between the legs 136, 138 for engaging the top surface 24 of the deck railing 22. The lower surface 142 of the top plate 134 may define a plurality of standoffs 152 for spacing the top plate 134 from the top surface 24 of the deck railing 22 and allowing airflow therebetween. The lower surface 142 of the top plate 134 may also define a generally rectangular opening 184 defining a battery compartment 186 and covered by a battery door 188 with a door fastener 190 holding the battery door 188 closed.

Figure 11:
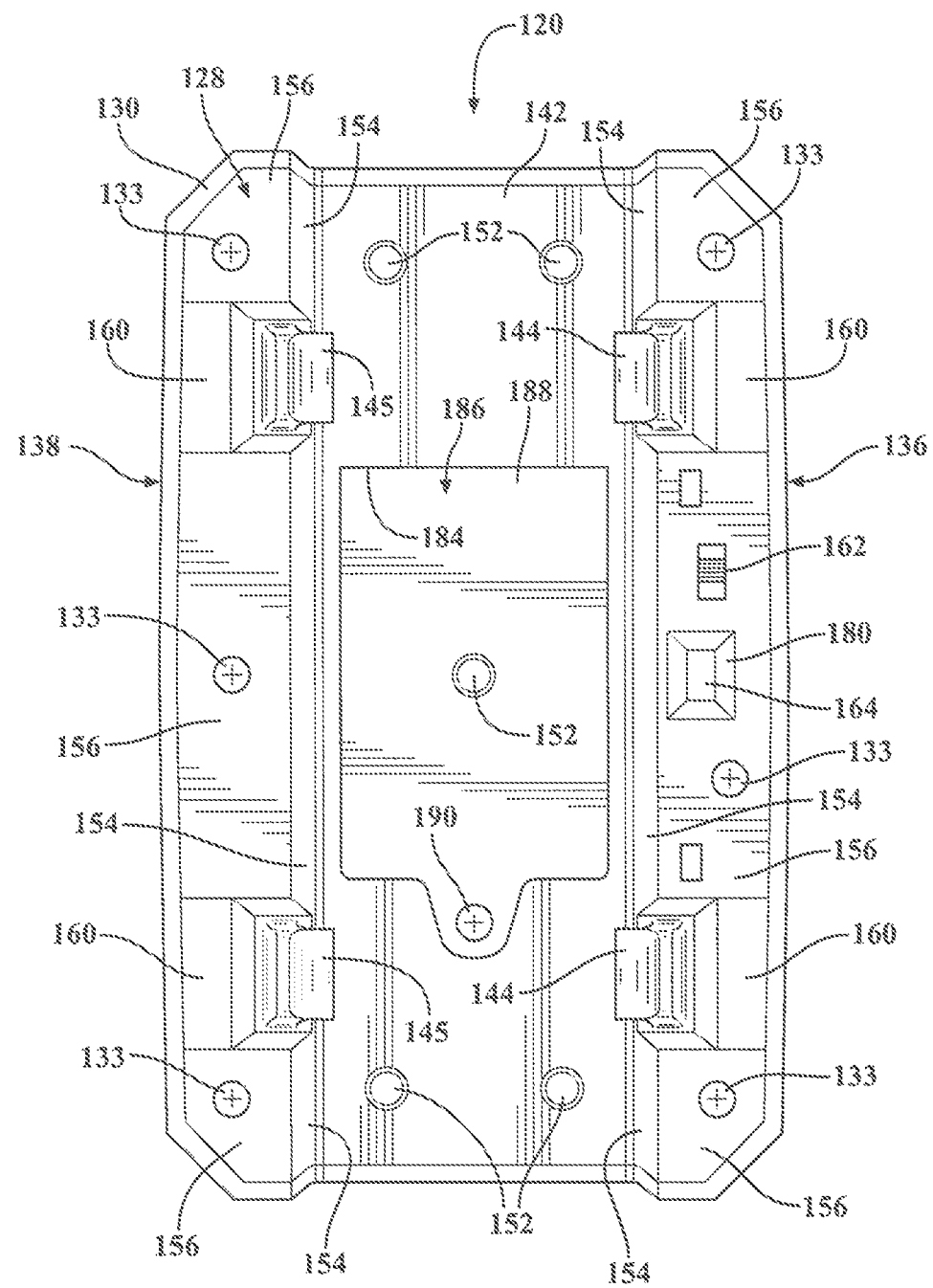
FIG. 11 is a bottom view of the deck light assembly of FIG. 6.
Figure 12:
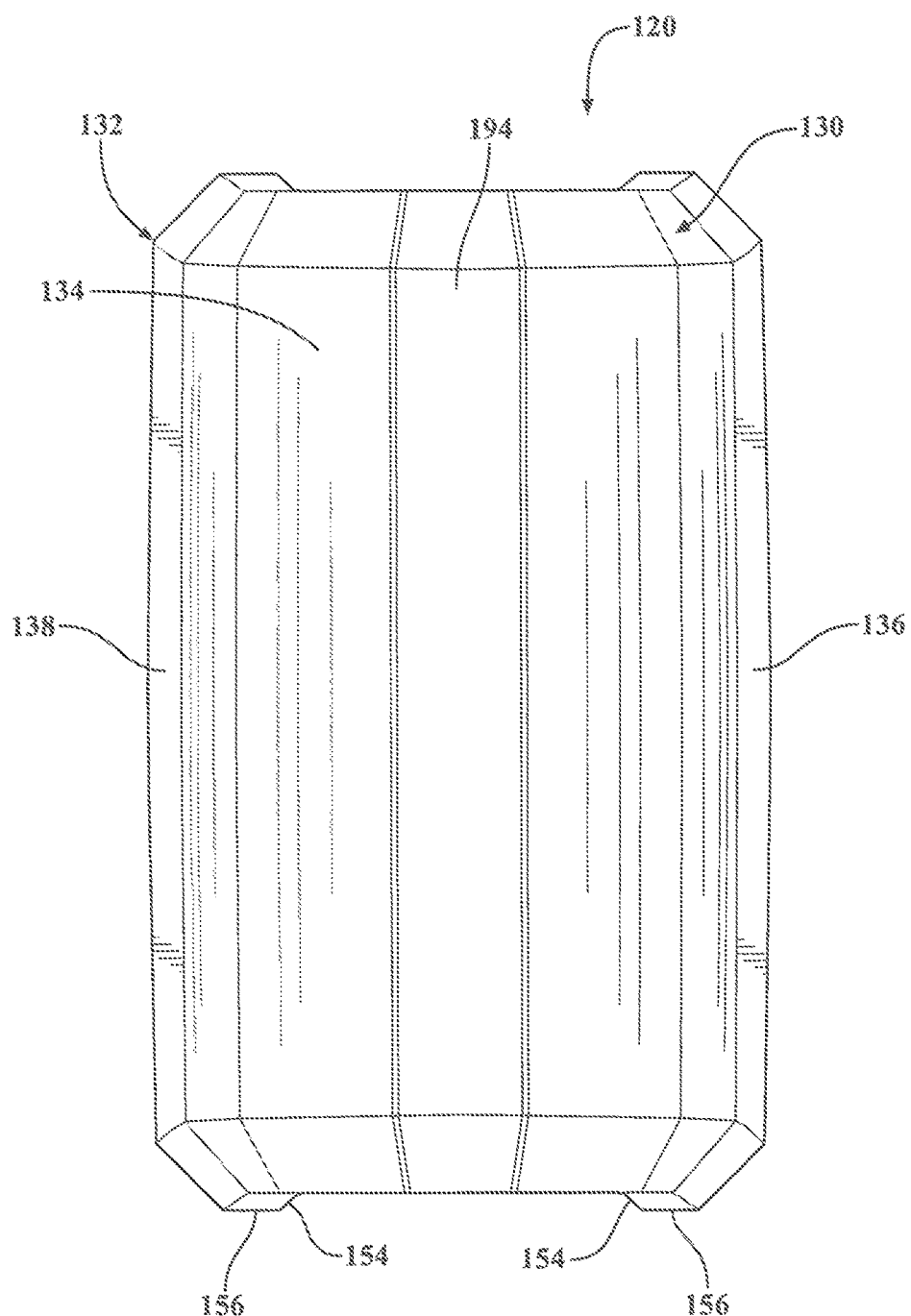
FIG. 12 is a top view of the deck light assembly of FIG. 6.

According to an aspect and as exemplarily shown in FIG. 11, an LED light 164 may be disposed within the C-shaped body 132 between the core 128 and the cover 130. A battery may also be disposed within the C-shaped body 132 and within the battery compartment 186. Those skilled in the art would appreciate that other energy storage devices, such as capacitors, could be used in place of a battery. According to an aspect, the upper surface 140 of the top plate 134 can hold a solar panel for charging the battery when exposed to light. According to a further aspect, the deck light 120 may include circuitry which is configured to cause the LED light 164 to illuminate in response to an absence of ambient light acting upon the solar panel. According to another aspect, the deck light 120 may include a light sensor for automatically activating the LED light 164 in response to the ambient light being below a predetermined value.

Figure 7:
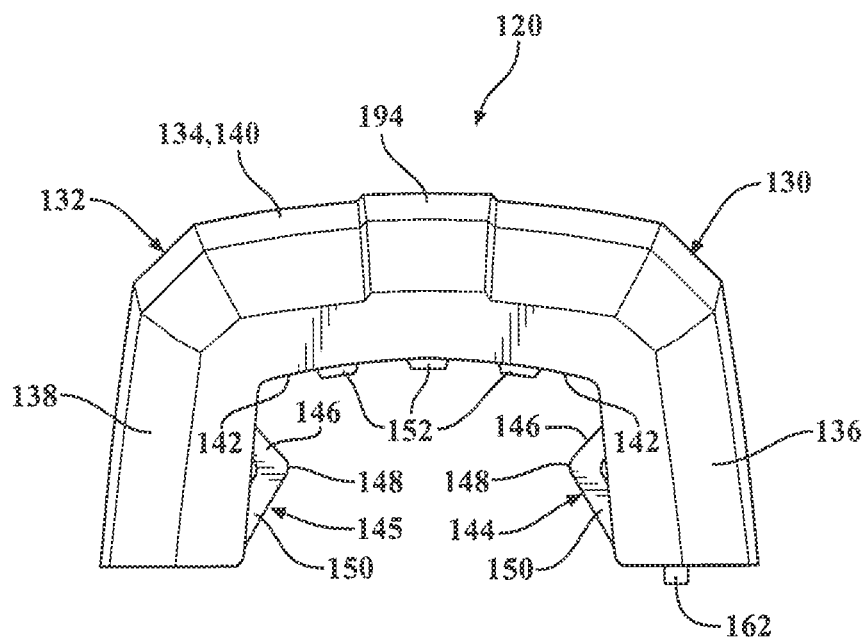
FIG. 7 is a first end view of the deck light assembly of FIG. 6.
Figure 8:
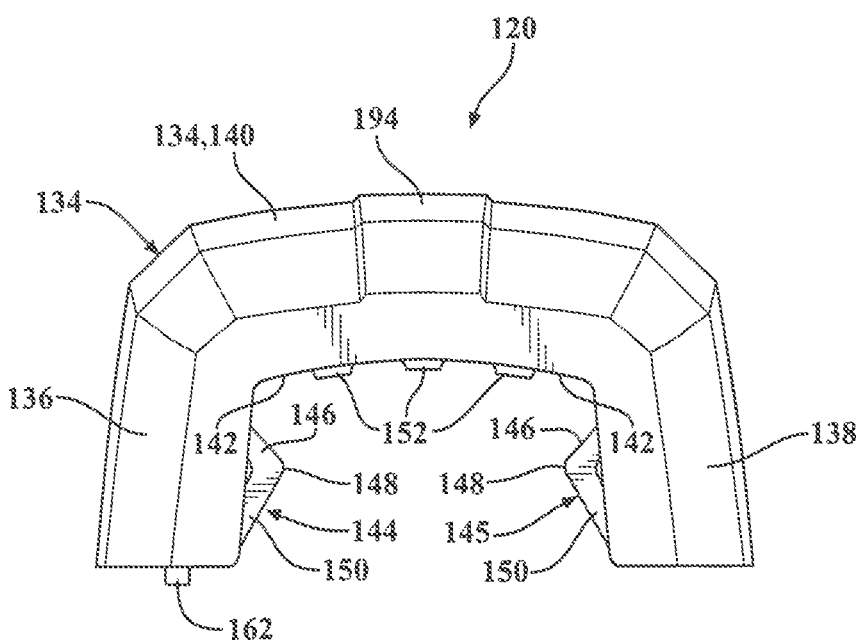
FIG. 8 is a second end view of the deck light assembly of FIG. 6.
Figure 9:
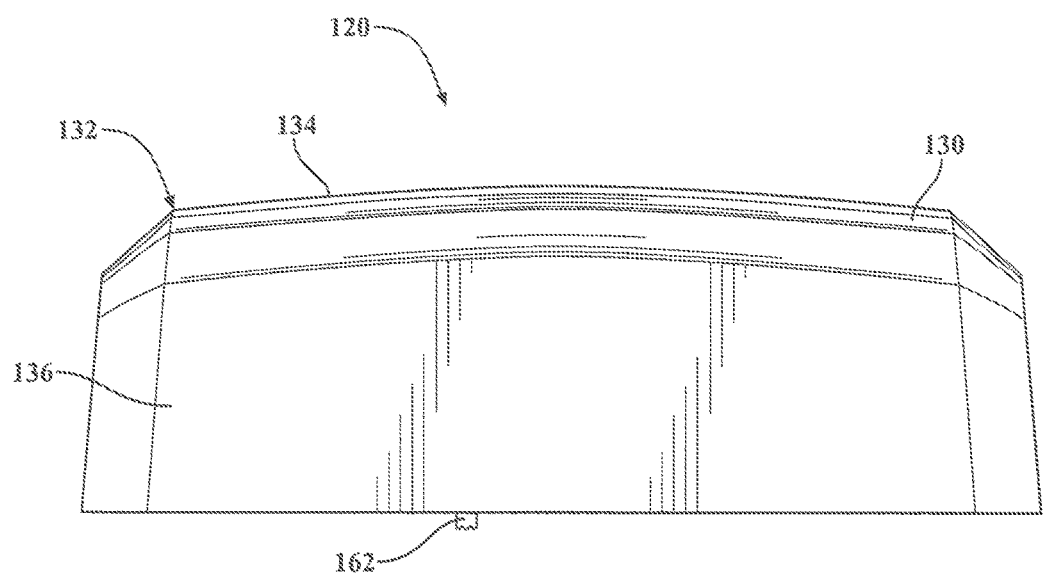
FIG. 9 is a first side view of the deck light assembly of FIG. 6.
Figure 10:
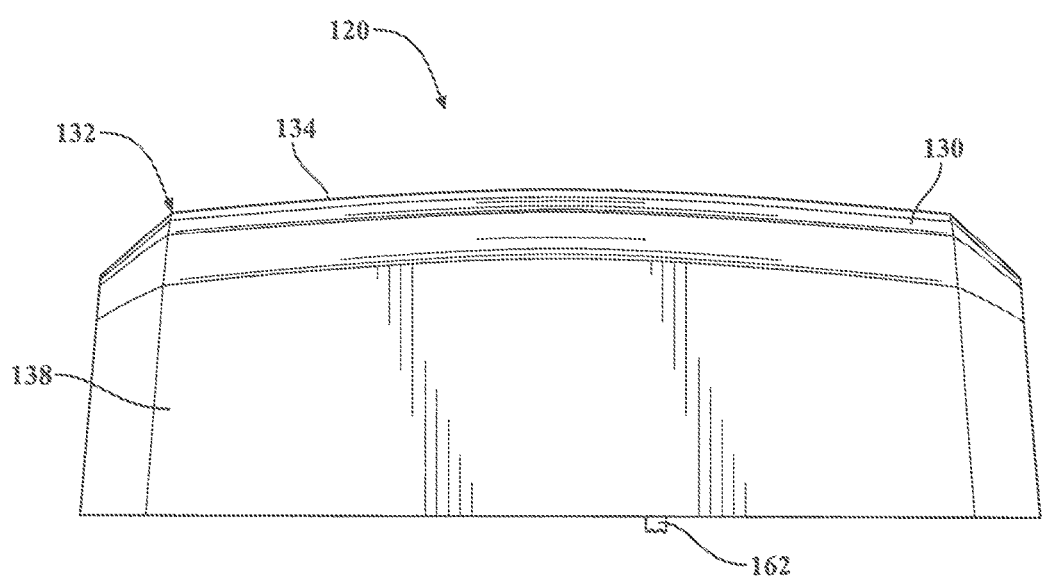
FIG. 10 is a second side view of the deck light assembly of FIG. 6.

According to an aspect and as exemplarily shown in FIGS. 7, 8, and 11, the legs 136, 138 of the core 128 may include a vertical portion 154 extending perpendicularly from the top plate 134 to a floor 156 spaced from and parallel to the top plate 134 and which extends outwardly along the length of each leg 136, 138 between the vertical portion 154 and the cover 130. As best shown in FIG. 11, the core 128 may define a pair of interruptions 160 within each of the legs 136, 138 which may be generally rectangular openings in the vertical portion 154 and in the adjacent floor 156. Each of the interruptions 160 may be approximately one inch long.

As best shown in FIGS. 7, 8, and 11, the core 128 may define a first clamping member 144 in each of the interruptions 160 of the first leg 136 for engaging an adjacent one of the side surfaces 25 of the deck railing 22 and having a generally V-shaped cross-section with a top portion 146 extending from the first leg 136 generally inwardly toward the second leg 138 and generally downwardly from the top plate 134 and to a knuckle 148, and with a bottom portion 150 extending generally downwardly from the knuckle 148, i.e. away from the top plate 134, and outwardly toward the first leg 136. In other words, the knuckle 148 may define the innermost tip of the V-shaped first clamping member 144. The knuckle 148 may extend along a line generally parallel to both the top plate 134 and the first leg 136. The core 128 may also define a second clamping member 145 in each of the interruptions 160 of the second leg 138 of the core 128 opposite the first clamping member 144 and configured as a mirror-image of the first clamping member 144 for holding the deck railing 22 between the opposing clamping members 144, 145. According to an aspect, the first leg 136 may include a plurality of first clamping members 144 spaced apart from one another. For example, as shown in FIG. 11, each of the legs 136, 138 may include two of the clamping members 144, 145 spaced apart from one another along the length of each respective leg 136, 138.

Figure 6:
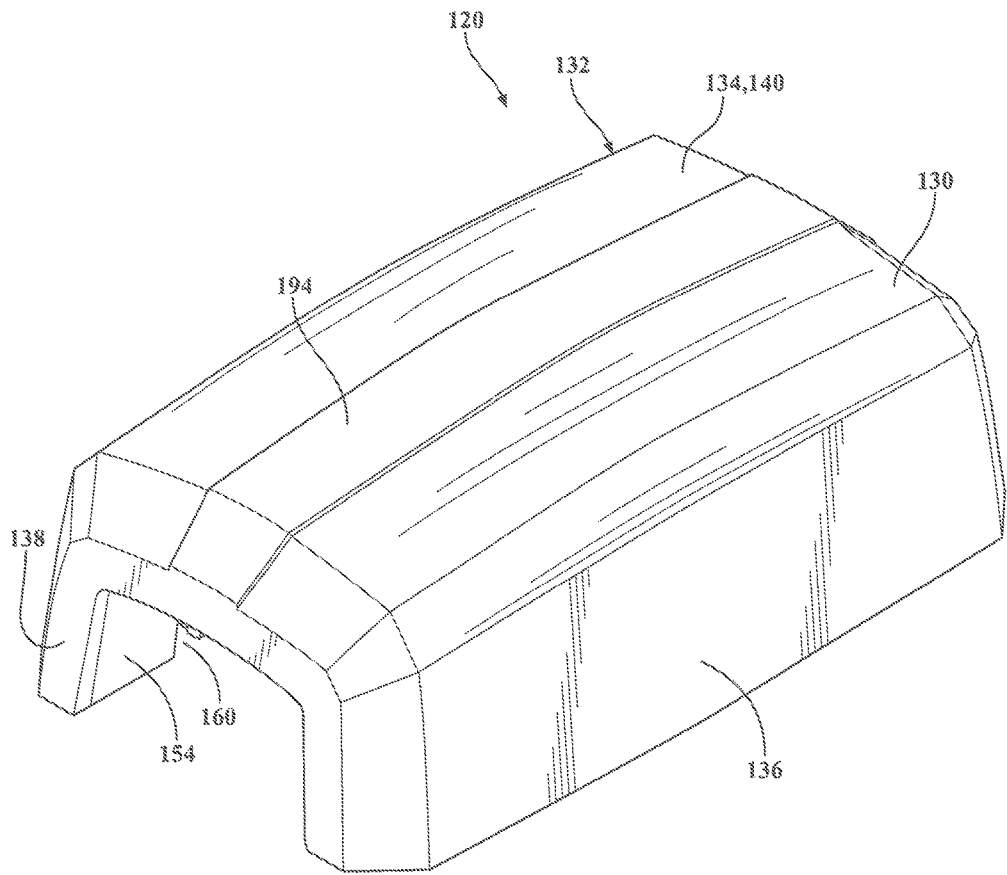
FIG. 6 is a perspective view of a deck light assembly in accordance with an another aspect of the disclosure.

As best shown in FIG. 6, the upper surface 140 of the top plate 134 may define a ridge 194 protruding upwardly and extending the length of the top plate 134. As shown in FIG. 7, a plurality of fasteners, such as screws 133, may pass through the floor 156 of the core 128 in order to secure the core 128 to the cover 130. The floor 156 of the first leg 136 of the core 128 may define a recess 180 and having a generally rectangular shape with an LED light 164 disposed therein for projecting light downwardly from the deck light assembly 120. A switch 162 may be provided for allowing a user to torn the LED light 164 on or off. The switch may extend downwardly from the floor 156 of the core 128 and may be disposed adjacent to the recess 180.

In operation, the opposing clamping members 144, 145 are biased to an inward position for holding the deck rail 22 therebetween. Depending on the thickness of the deck rail 22, the knuckles 144 may contact the side surfaces 25 of the deck rail 22. The top portions 146 of the clamping members 144, 145 may engage a lower corner of the deck rail 22 between the side surfaces 25 and the bottom surface 26. This may especially be the case with thinner deck rails 22, having shorter sides 25. The clamping members 144, 145 may be flexible outwardly through interaction of the bottom portions 150 with the deck railing 22 by application of a downward force on the deck light assembly 120 for installation thereupon. In other words, the deck light assembly 120 may be secured upon the deck railing 22 by merely setting the deck light assembly on top of the deck railing 22 and pushing it downward. The clamping members 144, 145 would flex outwardly due to the interaction between the angled bottom portions 150 and the top surface 24 of the deck railing 22. The clamping members 144, 145 may also be manually displaced outwardly, and thereby releasing their securement to the deck railing 22. Because the bottom portions bottom portions 150 of the clamping members 144, 145 are angled outwardly, they may remain spaced from the deck railing 22 with the deck light assembly 120 secured thereon. A person may reach into the spaces between the bottom portions 150 and the deck railing 22 with their fingers or thumbs to pull the clamping members 144, 145 outwardly. In this way, the deck light assembly 20 may be slid along the deck railing 22 or may be lifted and removed entirely.

According to another aspect, the deck light assembly 120 may be configured for attachment to a deck railing having one or more surfaces. The deck light assembly 120 may include a body 132 having an interior surface configured to mimic at least a portion of the deck railing 22. A portion of the body 132 may include a first clamping member 144 for engaging the deck railing 22. Another portion of the body 132 may include a second clamping member 145 opposite the first clamping member 144 for holding the deck railing between the clamping members 144, 145. The clamping members 144, 145 may be biased inwardly to engage the the deck railing 22. The clamping members 144, 145 may also be configured to flex outwardly for disengaging the deck light assembly 120 from the deck railing 22. With the clamping members 144, 145 in their outward or disengaged position, the deck light assembly 120 may be slid along the deck railing 22 or may be lifted and removed entirely.

According to a still further aspect, the assembly 20, 120 can account for varying thicknesses in railing boards due to its flexibility. Additionally the assembly 20, 120 can have at least one beverage holder formed in the upper surface. The assembly 20, 120 can also include wireless Bluetooth or Wifi capabilities to allow for streaming of music such as via an associated mobile phone.

Obviously, many modifications and variations of the present invention are possible in light of the above teachings and may be practiced otherwise than as specifically described while within the scope of the appended claims.

What is claimed is:

1. A deck light assembly for attachment to a deck railing, the deck light assembly comprising:
   a body having a generally C-shape including a top plate extending between a first leg and a second leg and defining a lower surface for engaging the top surface of the deck railing;
   a battery and an LED light disposed at least partially within the body;
   a first clamping member having a generally V-shaped cross-section with a top portion extending from said first leg generally inwardly toward said second leg and generally downwardly away from said top plate to a knuckle, and with a bottom portion extending generally downwardly from said knuckle and generally outwardly toward said first leg; and
   said body including a cover overlying said first clamping member and presenting an uninterrupted outer surface; and
   wherein said body includes a core, and wherein said core defines an interruption in each of said legs, and wherein said first clamping member is disposed in one of said interruptions.

2. The deck light assembly of claim 1, further including: said second leg defining a second clamping member opposite the first clamping member and configured as a mirror-image thereof for holding the deck railing therebetween.

3. The deck light assembly of claim 1, wherein said first leg includes a plurality of said first clamping members spaced apart from one another.

4. The deck light assembly of claim 1, wherein said first clamping member is member is integrally formed with said body.

5. The deck light assembly of claim 1, further comprising: a light sensor for automatically activating the LED light in response to the ambient light being below a predetermined value.

6. The deck light assembly of claim 1, further comprising: said lower surface of the top plate defining an opening defining a battery compartment and covered by a battery door with a door fastener holding said battery door closed.

7. The deck light assembly of claim 1, further comprising: a plurality of screws extending through said core for securing said core to said cover.

8. The deck light assembly of claim 1, wherein said lower surface of the said plate defines a plurality of standoffs for spacing the top plate from the top surface of the deck railing and allowing airflow therebetween.

9. The deck light assembly of claim 1, further comprising: a switch being externally accessible for allowing the LED light to be turned on or off.

10. The deck light assembly of claim 9, wherein said switch is adjacent to said LED light.

11. The deck light assembly of claim 1, further comprising:
   a solar panel disposed upon the top plate for charging the battery when exposed to light.

12. The deck light assembly of claim 11 further including circuitry configured to cause said LED light to illuminate in response to an absence of ambient light acting upon said solar panel.

13. The deck light assembly of claim 1, further comprising:
   a shade for directing the output of the LED light in a predetermined pattern.

14. The deck light assembly of claim 13 wherein the shade protrudes from an outer surface of one of the first leg and the second leg with the LED light contained therein.

15. The deck light assembly of claim 14 wherein the shade has a parabolic shape extending to a flat bottom defining a hole for allowing light to shine downwardly from the deck railing.

16. A deck light assembly for attachment to a deck railing, the deck light assembly comprising:
   a body having a generally C-shape including a top plate extending between a first leg and a second leg and defining a lower surface for engaging the top surface of the deck railing;
   a battery and an LED light disposed at least partially within the body;
   a first clamping member having a generally V-shaped cross-section with a top portion extending from said first leg generally inwardly toward said second leg and generally downwardly away from said top plate to a knuckle, and with a bottom portion extending generally downwardly from said knuckle and generally outwardly toward said first leg; and
   said body including a cover overlying said first clamping member and presenting an uninterrupted outer surface; and
   wherein said legs each include a vertical portion perpendicular to said top plate and extending to a floor spaced from and parallel to said top plate with said floor extending outwardly from said vertical portion and away from the other one of said legs.

17. The deck light assembly of claim 16 wherein said floor defines a recess with an LED light disposed therein for projecting light downwardly from said deck light assembly.

18. A deck light assembly for attachment to a deck railing, the deck light assembly comprising:
   a body having a generally C-shape including a top plate extending between a first leg and a second leg and defining a lower surface for engaging the top surface of the deck railing;
   a battery and an LED light disposed at least partially within the body;
   a first clamping member having a generally V-shaped cross-section with a top portion extending from said first leg generally inwardly toward said second leg and generally downwardly away from said top plate to a knuckle, and with a bottom portion extending generally downwardly from said knuckle and generally outwardly toward said first leg;
   a shade for directing the output of the LED light in a predetermined pattern; AND
   wherein the shade protrudes from an outer surface of one of the first leg and the second leg with the LED light contained therein.

19. The deck light assembly of claim 18 wherein the shade has a parabolic shape extending to a flat bottom defining a hole for allowing light to shine downwardly from the deck railing.

20. A deck light assembly for attachment to a deck railing, the deck light assembly comprising:

a body having a generally C-shape including a top plate extending between a first leg and a second leg and defining a lower surface for engaging the top surface of the deck railing;
   a battery and an LED light disposed at least partially within the body;
   a first clamping member having a generally V-shaped cross-section with a top portion extending from said first leg generally inwardly toward said second leg and generally downwardly away from said top plate to a knuckle, and with a bottom portion extending generally downwardly from said knuckle and generally outwardly toward said first leg; and
  said lower surface of the top plate defining an opening defining a battery compartment and covered by a battery door with a door fastener holding said battery door closed.

21. A deck light assembly for attachment to a deck railing, the deck light assembly comprising:

a body having a generally C-shape including a top plate extending between a first leg and a second leg and defining a lower surface for engaging the top surface of the deck railing;
   a battery and an LED light disposed at least partially within the body;
   a first clamping member having a generally V-shaped cross-section with a top portion extending from said first leg generally inwardly toward said second leg and generally downwardly away from said top plate to a knuckle, and with a bottom portion extending generally downwardly from said knuckle and generally outwardly toward said first leg; and
wherein said lower surface of the said plate defines a plurality of standoffs for spacing the top plate from the top surface of the deck railing and allowing airflow therebetween.

* * * * *